T. S. STEVENS.
Steam Plow.

No. 21,857.

Patented Oct. 19, 1858.

AM. PHOTO-LITHO. CO. N.Y. (OSBORNE'S PROCESS.)

UNITED STATES PATENT OFFICE.

THOMAS S. STEVENS, OF PEPPERILL, MASSACHUSETTS.

IMPROVEMENT IN CULTIVATORS.

Specification forming part of Letters Patent No. 21,857, dated October 19, 1858.

*To all whom it may concern:*

Be it known that I, THOMAS S. STEVENS, of Pepperill, in the county of Middlesex and State Massachusetts, have invented a new and useful or Improved Sod and Root Cutter or Land-Pulverizer; and I do hereby declare that the same is fully described and represented in the following specification and the accompanying drawings, of which—

Figure 1:
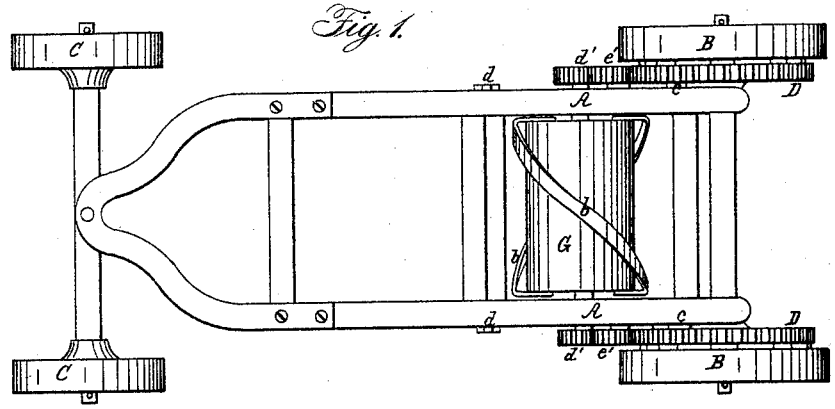
Figure 2:
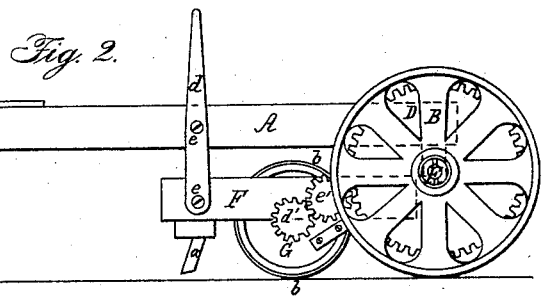
Figure 3:
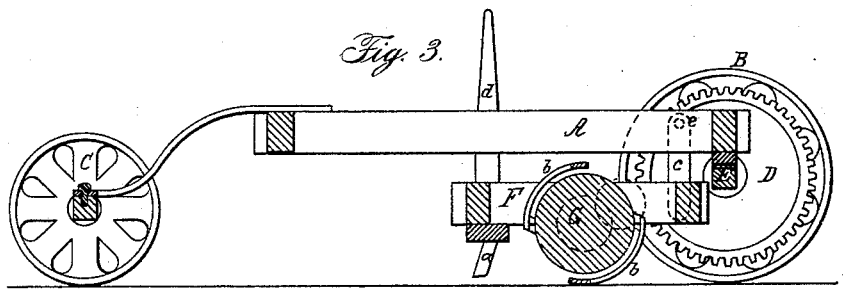
Figure 4:
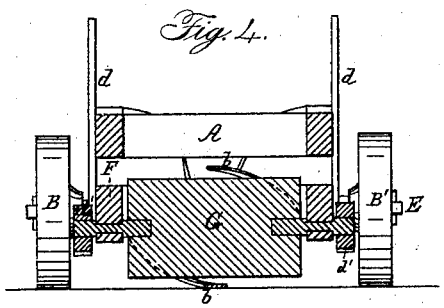

Figure 1 is a top view, Fig. 2 a side elevation, Fig. 3 a longitudinal and vertical section, and Fig. 4 a transverse section, of it.

In these drawings, A denotes a carriage mounted on four wheels, B B C C, and carrying two driving-gears, D D, affixed on its rear axle, E. Underneath the said carriage is a movable cutter-frame, F, which carries at its front a series of vertical stripping-cutters, *a a a*, arranged therein, as seen in the figures. Besides such cutters, the said frame F supports a rotary shaft or drum, G, carrying on its outer surface a set of spiral or other proper knives, *b b*, so arranged as not only to cut horizontally underneath the surface of the land in directions transverse of the machine when the drum or shaft is put in rotation, but to cut in circular paths concentric with the drum. Thus when the machine or carriage is drawn over the surface of the land its knives *a a* score or cut into the sod in vertical and parallel lines or paths, while the under surface-cutters revolve and cut under the surface of the sod and raise it, each of the knives *b* being arranged with respect to the surface of the drum in such manner that the earth under which it may work shall pass through the space between it and the periphery of the drum.

The cutter-frame is suspended from the carriage by means of two links, *c c*, and two handles or levers, *d d*, serving as links, each of the links and levers being caused to turn on joint-pins *e e*, and in such manner that by turning the upper arms of the levers toward the rear axle the cutter-frame may be moved forward and raised upward at one and the same time, so as not only to raise the cutters out of action with or entirely above the ground, but at the same time to throw the driving-gears of the rear axle out of engagement with the gears which are applied to the cutter-frame. When the cutter-frame is so raised upward the carriage may be drawn over the land without any rotary motion of the drum being produced or without any action of the cutters on the soil. These last-mentioned gears are shown at $d'\ d'$ and $e'\ e'$. Those marked $d$ are fixed on the shaft of the rotary drum, while the gears $e\ e$ are what are termed "connection-gears," and work on separate axles. When the hand-levers are in vertical positions the gears of the cutter-frame are in engagement with the driving-gears. Under these circumstances, if the carriage is drawn along over the surface of a tract of land, and the front cutters are caused to enter the sod, they will cut it in parallel strips, and such strips, by the rotary cutters, will be cut into in curved paths, so as to be sliced and turned over or pulverized more or less. The roots extending into the paths of the rotary cutters will be cut or separated by them.

I am aware that for cutting sods and roots a series of stationary surface-cutters, like under-surface plows, have be n used in connection with a set of vertical scoring-knives, and on one frame therewith. Consequently I do not claim such. Each of the knives of the rotary drum is a spiral or helical knife, or so formed as to cut in a curved instead of a horizontal path, and it passes into and out of the soil during each rotation of the drum. Therefore its action on the soil is different from that of a stationary horizontal knife or plow-share, which works in a horizontal path only under the surface, and in connection with the vertical cutters separates the soil into ribbons or strips. The rotary cutters of my machine not only perform the function of the stationary plow-cutters, but they break up or cut the soil in curved paths, so as to reduce the strips to pieces, and they raise these pieces and turn them over more or less, whereby the roots will also be separated and thrown out of place.

What, therefore, I claim is—

The combination of a set of vertical stripping-cutters, *a a*, and a set or series of revolving under surface-cutters, *b b*, applied to operate together, substantially as specified.

In testimony whereof I have hereunto set my signature.

THOMAS S. STEVENS.

Witnesses:
ANDREW I. SHATTUCK,
C. W. BELLOUS.